US012799988B2

(12) United States Patent
Mobaraki et al.

(10) Patent No.: US 12,799,988 B2
(45) Date of Patent: Nov. 17, 2026

(54) ADJUSTABLE SHAFT COUPLING AND METHODS OF USE

(71) Applicant: SAUDI ARABIAN OIL COMPANY, Dhahran (SA)

(72) Inventors: Mohammad Mobaraki, Dammam (SA); Abdulrahman Alsaedi, Jeddah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 359 days.

(21) Appl. No.: 18/423,131

(22) Filed: Jan. 25, 2024

(65) Prior Publication Data

US 2025/0243911 A1 Jul. 31, 2025

(51) Int. Cl.
*F16D 3/72* (2006.01)
*F16D 3/06* (2006.01)

(52) U.S. Cl.
CPC *F16D 3/72* (2013.01); *F16D 3/06* (2013.01)

(58) Field of Classification Search
CPC .......... B25D 17/088; F16C 3/03; F16C 3/035; F16D 1/04; F16D 1/08; F16D 1/0852; F16D 1/0864; F16D 1/087; F16D 3/06; F16D 3/18; F16D 3/185; F16D 3/72; F16D 2001/102; F16D 2001/103; Y10S 403/04; Y10S 403/09; Y10S 464/901; Y10T 403/4617; Y10T 403/535; Y10T 403/7041; Y10T 403/7066; Y10T 403/7067
USPC ........ 464/150, 162, 182, 901; 403/236, 290, 403/362, 374.2, 374.3, DIG. 4, DIG. 9;
(Continued)

(56) References Cited

U.S. PATENT DOCUMENTS 136,349 A * 2/1873 Westcott ........... B23B 31/16004 279/114
808,257 A * 12/1905 Reed ..................... B23B 31/404 279/116
(Continued)

FOREIGN PATENT DOCUMENTS

WO WO-8000427 A1 * 3/1980 ....... B23B 31/16004
WO WO-0119662 A1 * 3/2001 ................ F16C 3/03

OTHER PUBLICATIONS

L. Vassilopoulos et al.; "Modeling of Shaft Couplings for Alignment and Vibration Calculations"; Paper presented at the SNAME Propellers '88 Symposium, Virginia Beach, Virginia, USA, Sep. 1988; https://doi.org/10.5957/PSS-1988-20.

*Primary Examiner* — Josh Skroupa
(74) *Attorney, Agent, or Firm* — Vorys, Sater, Seymour and Pease LLP

(57) ABSTRACT

An adjustable shaft coupling includes a first coupling including a first adjustable coupling hub operatively coupled to a first adjustable spacer member, and a second coupling including a second adjustable coupling hub operatively coupled to a second adjustable spacer member. The first and second adjustable spacer members are engageable to co-axially align the first and second couplings along a central axis and transmit torque and rotational motion between the first and second couplings. The first adjustable coupling hub is actuatable to grippingly engage a drive member, and the second adjustable coupling hub is actuatable to grippingly engage a driven member such that rotation of the drive member correspondingly rotates the driven member in a same angular direction.

17 Claims, 3 Drawing Sheets

(58) Field of Classification Search
USPC ..... 279/105.1, 110, 112, 114, 115, 116, 143, 279/144, 145
See application file for complete search history.

(56) References Cited

U.S. PATENT DOCUMENTS

| | | | | | |
|---|---|---|---|---|---|
| 2,177,326 | A * | 10/1939 | Morris | B23B 31/101 | 279/112 |
| 2,449,751 | A * | 9/1948 | Rogers | B23B 31/16004 | 279/112 |
| 2,639,157 | A * | 5/1953 | Buck | B23B 31/36 | 279/6 |
| 4,530,508 | A * | 7/1985 | Ferraro | B23B 31/16295 | 279/110 |
| 4,747,723 | A * | 5/1988 | Hasley | F16D 1/0864 | 403/220 |
| 6,840,862 | B2 * | 1/2005 | Daniel | F16D 1/0864 | 464/93 |
| 7,513,709 | B2 * | 4/2009 | Shimada | F16D 1/0864 | 464/134 |
| 7,516,964 | B2 * | 4/2009 | Ubele | B23B 31/16295 | 279/6 |
| 8,235,420 | B2 * | 8/2012 | Moriyama | F16D 1/0864 | 464/134 |
| 9,051,973 | B2 | 6/2015 | Nakagawa et al. | | |
| 9,080,598 | B2 * | 7/2015 | Hametiaux | F16D 3/38 | |
| 9,771,969 | B2 * | 9/2017 | Tokioka | F16C 3/03 | |
| 11,236,784 | B2 * | 2/2022 | Schwarzhans | F16C 39/02 | |
| 11,723,322 | B2 * | 8/2023 | Santiesteban | F16D 1/0864 | 464/73 |
| 11,942,894 | B2 * | 3/2024 | De Fresart | F16C 3/02 | |
| 12,523,259 | B2 * | 1/2026 | Moriyama | F16D 3/06 | |

* cited by examiner

ADJUSTABLE SHAFT COUPLING AND METHODS OF USE

FIELD OF THE DISCLOSURE

The present disclosure relates generally to a transmission assembly and, more particularly, to a transmission assembly for transmitting rotational displacement between a drive assembly and driven assembly.

BACKGROUND OF THE DISCLOSURE

While transmission assemblies, in particular mechanical couplers, are known, several challenges remain to be addressed.

Among these challenges, misalignments in terms of height, lateral position, and angular orientation between a drive member and a driven member is a significant concern as such misalignments may lead to increased wear and unwanted vibrations which result in decreased efficiency. Additionally, misalignments due to dimensional variations in the form of manufacturing tolerances, thermal expansion and the like can result in difficulties aligning shafts of the drive member and driven member, as well as unwanted forces, stresses, and vibrations, all of which can lead to increased wear, thereby compromising performance (rotational transmission). Another challenge is the incompatibility that may arise when using mechanical couplers that are unsuitable, which may also lead to reduced efficiency, and/or damage. Yet another challenge is the material from which known mechanical couplers are manufactured, which may not be able to withstand high pressure and extreme environments and may not be flexible enough to allow bending and/or torsional flexibility.

Known mechanical couplings such as shaft couplings, emergency shaft couplings, and adjustable shaft couplings can somewhat compensate for misalignments between shafts, however, they are limited in terms of performance and flexibility. Further, known mechanical couplings are not generally compatible with various shaft sizes, and generally have the tendency of extended downtime periods.

The shaft coupling mechanism disclosed in U.S. Pat. No. 9,051,973 has the advantages of reducing collision noise during axial movement of one rotating shaft in relation to another, reducing frictional noise during rotational transmission, and provides a preferred contact area between components while reducing excessive compressive deformation of the connecting parts. However, this disclosure lacks in addressing the above-mentioned challenges.

In view of the above-mentioned challenges, there is a need for a versatile, adaptable, reliable, and efficient transmission assembly that is able to withstand high pressure and extreme environments, that is easy to use and maintain, and that is able to overcome challenges regarding dimensional, height, lateral position, and angular misalignments. Further, there is a need for a transmission assembly that can be used in to couple shafts of various sizes and/or shafts which are at varying distances from one another.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, an adjustable shaft coupling is disclosed and includes a first coupling including a first adjustable coupling hub operatively coupled to a first adjustable spacer member, and a second coupling including a second adjustable coupling hub operatively coupled to a second adjustable spacer member. The first and second adjustable spacer members are engageable to co-axially align the first and second couplings along a central axis and transmit torque and rotational motion between the first and second couplings, and the first adjustable coupling hub is actuatable to grippingly engage a drive member, and the second adjustable coupling hub is actuatable to grippingly engage a driven member such that rotation of the drive member correspondingly rotates the driven member in a same angular direction.

According to another embodiment consistent with the present disclosure, a method of using an adjustable shaft coupling includes the step of arranging the adjustable shaft coupling adjacent a first rotating machinery, the adjustable shaft coupling including a first coupling including a first adjustable coupling hub operatively coupled to a first adjustable spacer member, a second coupling including a second adjustable coupling hub operatively coupled to a second adjustable spacer member. The method further includes the steps of coupling the first adjustable coupling hub to a drive member of the first rotating machinery, coupling the second adjustable coupling hub to a driven member of a second rotating machinery, operatively coupling the first and second adjustable spacer members such that the first and second couplings are co-axially aligned along a central axis of the adjustable shaft coupling and rotate in unison, operating the first rotating machinery and thereby rotating the drive member, which causes the adjustable shaft coupling to rotate in a same angular direction, and transferring torque and rotational motion of the drive member to the driven member via the adjustable shaft coupling.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1A:
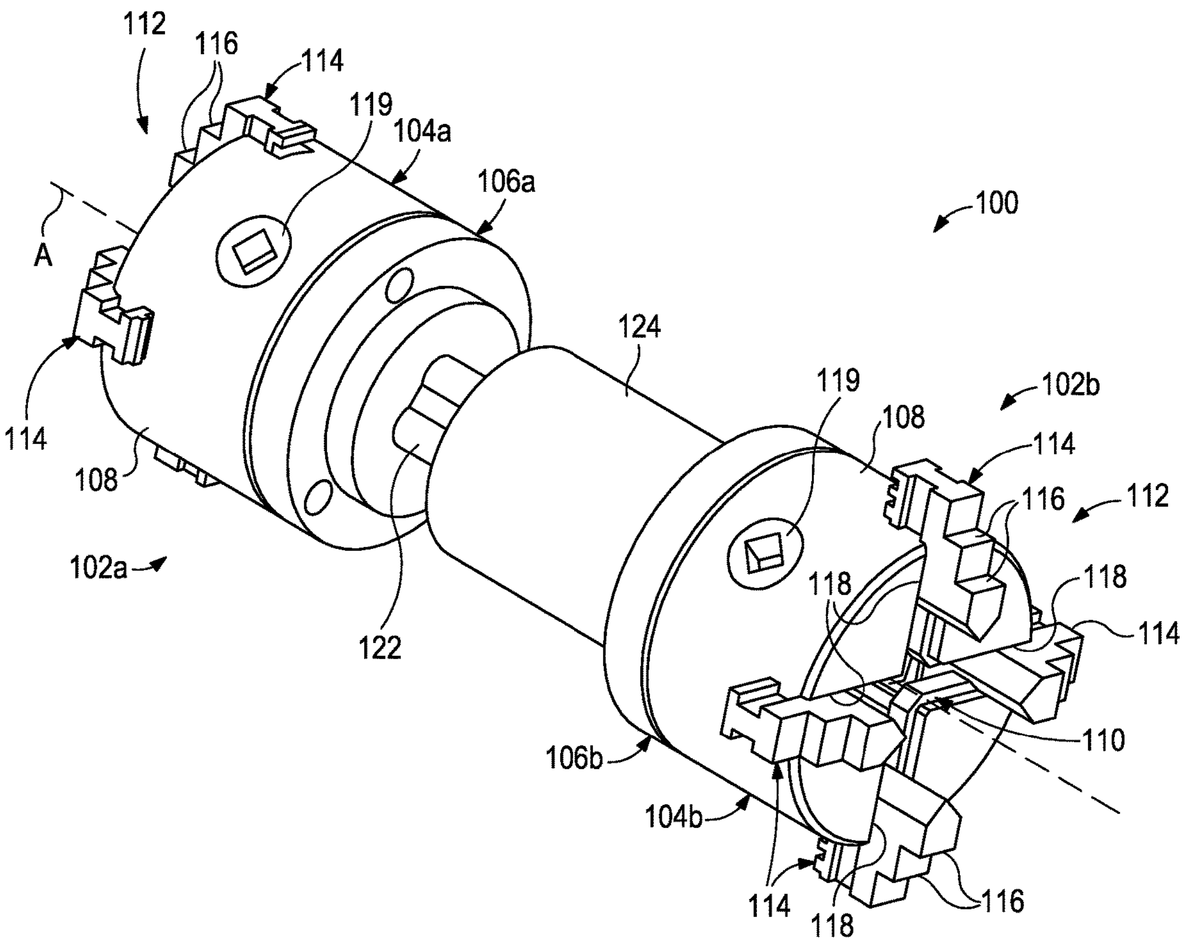
FIGS. 1A and 1B are isometric and side views, respectively, of an example adjustable shaft coupling that may incorporate the principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to a transmission assembly and, more particularly, to an adjustable shaft coupling for transmitting torque and rotational displacement between a drive assembly and a driven assembly. As described herein the adjustable shaft coupling may be designed for use in emergency scenarios where other couplings may not be readily accessible. The adjustable shaft coupling is a versatile coupling that can quickly connect different types of drive shafts, and may thus be referred to as a universal emergency coupling. Its compact design enables easy storage and transportation for emergency response teams. Moreover, the adjustable shaft coupling may be manufactured of a variety of durable materials to endure harsh conditions, high pressure, and extreme environments, which helps guarantee long-lasting performance during critical situations. The adjustable shaft coupling offers a reliable and efficient solution for reducing downtime and maximizing safety.

Figure 1B:
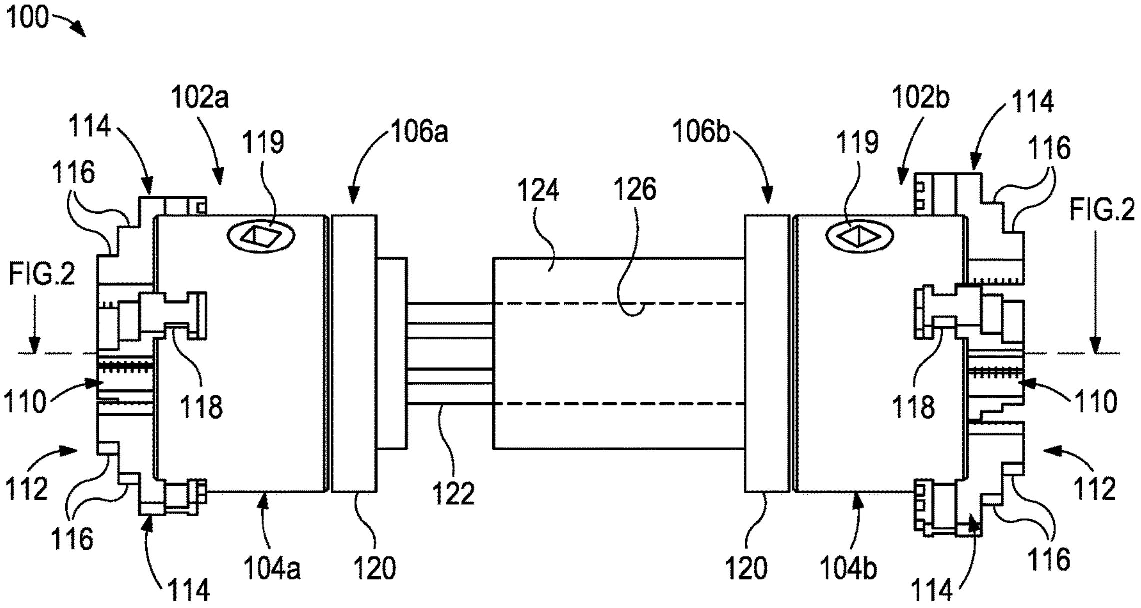

FIGS. 1A and 1B are isometric and side views, respectively, of an example adjustable shaft coupling 100 that may incorporate the principles of the present disclosure. As illustrated, the adjustable shaft coupling 100 may include a first or "input" coupling 102*a* and a second or "output" coupling 102*b* operatively coupled to the input coupling 102*a*. The input coupling 102*a* includes a first adjustable coupling hub 104*a* operatively coupled to a first adjustable spacer member 106*a*. Similarly, the output coupling 102*b* includes a second adjustable coupling hub 104*b* operatively coupled to a second adjustable spacer member 106*b*. As described herein, the first adjustable coupling hub 104*a* may be adjustable and otherwise actuatable to engage and grip a drive member (not shown) pertaining to rotating machinery or equipment, and the second adjustable coupling of 104*b* may be adjustable and otherwise actuatable to engage and grip a driven member (not shown) pertaining to opposing rotating machinery or equipment. The first and second adjustable spacer members 106*a,b* may be configured to maintain the first and second adjustable coupling hubs 104*a,b* in engagement and co-axially aligned along a central axis A of the adjustable shaft coupling 100, and may further facilitate transmission of torque and rotational motion from the input coupling 102*a* to the output coupling 102*b*, or vice versa.

The first and second adjustable coupling hubs 104*a,b* may be operatively coupled to the first and second adjustable spacer members 106*a,b*, respectively, via any connecting arrangement including, but not limited to, a nut-and-bolt arrangement, a spline arrangement, a threaded arrangement, a clamp arrangement, welding, a key-and-keyway arrangement, a pin-and-hole arrangement, a set screw fastening arrangement, a geared interface (with gear lube), a matable key and key way interface (with gear lube), or any combination thereof. In the illustrated embodiment, the first and second adjustable coupling hubs 104*a,b* are operatively and removably coupled to the first and second adjustable spacer members 106*a,b* via corresponding nut-and-bolt arrangements. In some embodiments, the connecting arrangement between the coupling hubs 104*a,b* and the spacer members 106*a,b* can comprise resiliently deformable elements for improving flexibility between the adjustable spacer members 106*a,b* and the adjustable coupling hubs 104*a,b*, typically for allowing a degree of bending and/or torsional flexibility therebetween. It is to be appreciated that such flexibility serves to accommodate various misalignments and offers a degree of vibrational damping between components of the adjustable shaft coupling 100 during operation.

Each adjustable coupling hub 104*a,b* may provide or otherwise define a generally cylindrical body 108 that defines a central cavity 110 configured to receive an end of a corresponding drive or driven member (not shown). The central cavity 110 extends a short distance into the body 108 along the central axis A. The adjustable coupling hubs 104*a,b* may each further include a gripping mechanism 112 mounted to the body 108 and actuatable to grip the drive and driven members is received within the corresponding central cavities 110. As illustrated, each gripping mechanism 112 may include a plurality of gripping members 114 displaceably mounted to the body 108 and actuatable for gripping the drive or driven members therebetween. More specifically, the gripping members 114 may be displaceable radially inward and radially outward, towards and away from the central axis A. As they are displaced radially inward, the gripping members 114 progressively converge toward the central axis A and closer to each other and the central cavity 110. As they are displaced radially outward, the gripping members 114 progressively diverge away from the central axis A and away from each other and the central cavity 110. The displaceability of the gripping members 114 towards and/or away from the central cavity 110 allows gripping of drive or driven members of different sizes, shapes and configurations.

In the illustrated embodiment, the adjustable shaft coupling 100 includes four gripping members 114 equidistantly spaced about the central axis A at approximately 90° intervals. In other embodiments, however, more or less than four gripping member 114 may be employed. In at least one example, for instance, the adjustable shaft coupling 100 may include three gripping members 114 equidistantly spaced about the central axis A at approximately 120° intervals. In yet other embodiments, the gripping members 114 may be non-equidistantly spaced from each other about the central axis A, without departing from the scope of the disclosure.

In some embodiments, or in addition to the foregoing, the gripping members 114 may be capable of being inserted and expanded into a cavity (not shown) defined in the drive or driven members, wherein the gripping members 114 are displaced away from each other so as to outwardly grip an inner wall of the cavity. More particularly, in some embodiments, the gripping members 114 may have generally stepped profiles, wherein steps 116 defined by the gripping members 114 are circumferentially aligned so as to permit gripping an internal cavity of drive or driven members of different sizes without the need to displace the gripping members 114 entirely outward. Although FIGS. 1A-1B show that the steps 116 are oriented to face outwardly relative to the body 108, additional steps (not shown) can be defined in the gripping members 114 which face inwardly relative to the body 108. For the sake of clarity, the terms inwardly and outwardly used herein are intended to be understood such that inwardly is directed towards the central cavity 110 of the body 108 and outwardly is directed away from the central cavity 110 of the body 108.

The gripping members 114 are displaceably mounted within corresponding channels 118 defined in the body 108. The channels 118 have a generally elongate form for receiving generally elongate gripping members 114 therein. The gripping members 114 and the channels 118 comprise complementary engaging geometry configured to allow displacement of the gripping members 114 radially inward and outward, and inhibit displacement of the gripping members 114 out of the channels 118. The complementary engaging geometry defined by the gripping members 114 and the channels 118 may have a generally T-, I-, or H-shape, for example.

As described in more detail below, the gripping mechanism 112 may further include a rotatable socket 119 rotatably mounted to an associated with each adjustable coupling hub 104*a,b*. The gripping members 114 may be actuated radially inward or outward by operating (rotating) the corresponding rotatable sockets 119. Each rotatable socket 119 is operatively coupled to one or more gears or a "gear assembly" housed within the body 108 and operatively engageable with the gripping members 114 such that rotating the associated rotatable socket 119 causes the gripping members 114 to transition radially inward or outward, depending on the rotational direction of the corresponding rotatable socket 119. The rotatable sockets 119 resemble a chuck assembly used to progressively secure workpieces. Accordingly, the rotatable sockets 119 be sized and configured to receive a suitable tool, such as an Allen wrench or the like.

The adjustable spacer members 106*a,b* may each include or otherwise provide a flange 120 configured to be operatively coupled to the body 108 of the corresponding adjustable coupling hub 104*a,b*. In at least one embodiment, the flange 120 may be removably attached to the body 108 via a nut and bolt threaded engagement, or the like. In the illustrated embodiment, the first adjustable spacer member 106*a* may include a shaft 122 extending from the corresponding flange 120, and the second adjustable spacer member 106*b* may provide a sleeve 124 extending from the corresponding flange 120 and defining a sleeve channel 126 (FIG. 1B) sized and otherwise configured to receive the shaft 122. The shaft 122 and the sleeve channel 126 may be matable and otherwise operatively coupled to each other such that torque and rotational motion may be transferred between the input and output couplings 102*a,b* during operation.

Figure 2:
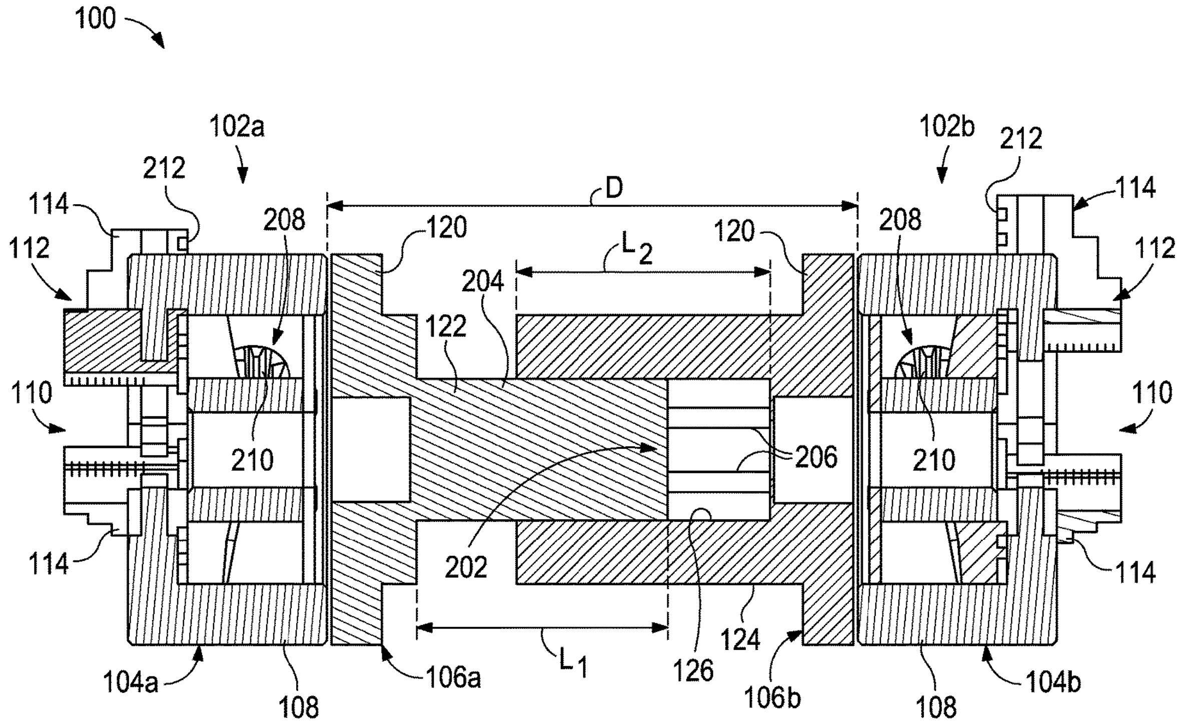
FIG. 2 is a cross-sectional side view of the adjustable shaft coupling of FIGS. 1A-1B taken along the lines indicated in FIG. 1B, according to one or more embodiments.

FIG. 2 is a cross-sectional side view of the adjustable shaft coupling 100 taken along the lines indicated in FIG. 1B, according to one or more embodiments. In the illustrated embodiment, the shaft 122 extends from the first adjustable spacer member 106*a* and, more particularly, from the flange 120 of the first adjustable spacer member 106*a*, but could alternatively extend from the first adjustable coupling hub 104*a*. Similarly, the sleeve 124 extends from the second adjustable spacer member 106*b* and, more particularly, from the flange 120 of the second adjustable spacer member 106*b*, but could alternatively extend from the second adjustable coupling hub 102*b*.

The sleeve 124 is of a generally tube- or sleeve-like form that defines the sleeve channel 126, and the shaft 122 may be received within the sleeve channel 126 in a typically male-female fashion. Receiving the shaft 122 within the sleeve channel 126 allows torque and rotational motion to be transferred between the first and second output couplings 102*a,b*. To facilitate the transfer of torque and rotational motion, the adjustable shaft coupling 100 may include an engagement mechanism 202 that operatively (rotatably) couples the shaft 122 to the sleeve 124, such that rotation of the shaft 122 will correspondingly rotate the sleeve 124 in the same direction, and vice versa. In some embodiments, the engagement mechanism 202 may comprise a retaining pin (not shown) insertable into an aperture (not shown) extending through the shaft 122 and the sleeve 124 after the shaft 122 is received within the sleeve channel 126. In such embodiments, a plurality of apertures could be provided for allowing insertion of the retaining pin at various positions along the length of the shaft 122 and the sleeve 124.

In other embodiments, however, the engagement mechanism 202 may comprise matable geometry defined by the shaft 122 and the sleeve 124. More specifically, in such embodiments, the shaft 122 may be splined and otherwise define a plurality of longitudinally extending protrusions 204, and the sleeve channel 126 may define or otherwise provide a corresponding plurality of longitudinally extending slots 206 sized to mate with and otherwise receive the protrusions 204. When the protrusions 204 are received within the slots 206, torque and rotational motion may be transferred between the first and second adjustable spacer members 106*a,b* and, more particularly, between the input and output couplings 102*a,b*.

In some embodiments, the protrusions 204 and the slots 206 may extend along the entire length of the shaft 122 and the sleeve channel 126, respectively. In other embodiments, however, the length of one or both of the protrusions 204 and the slots 206 may be less than the length of the shaft 122 or the sleeve channel 126, without departing from the scope of the disclosure. The protrusions 204 comprise non-circular cross-sectional shapes so as to inhibit relative rotational displacement between the first and second adjustable spacer members 106*a,b* during operation. The non-circular cross-sectional shapes are selected so as to optimize force and/or stress distribution around a perimeter thereof, typically having a shape which maximizes perimeter length so as to more uniformly distribute forces and/or stresses throughout and along the shaft 122 and the sleeve 124 in operation.

A fit between the protrusions 204 defined by the shaft 122 and the slots 206 defined by the sleeve 124 may have a tolerance which provides a degree of flexibility therebetween. The flexibility is in the form of bending and torsional flexibility. Although not clearly shown in the Figures, the fit can be in the form of a clearance fit, a transition fit, or an interference fit.

In some embodiments, an intermediate member (not shown) may be arranged between and otherwise interposing the protrusions 204 and the slots 206, which may help improve the fit therebetween. The intermediate member may be in the form of a resiliently deformable member for improving flexibility between the shaft 122 and the sleeve 124, typically for allowing bending and torsional flexibility therebetween. It is to be appreciated that the intermediate member may be used when the fit between the shaft 122 and the sleeve 124 is a clearance fit or a transition fit.

In some embodiments, a surface finish and/or coating can be applied to one or both of an outer surface of the shaft 122 and the inner surface of the sleeve channel 126. Such surface finishes or coatings may prove advantageous in helping to improve the fit (engagement) between the shaft 122 and the sleeve 124, and potentially offering a degree of flexibility therebetween.

The sleeve 124 has an outer profile of generally circular cross-section, but could alternatively exhibit other cross-sectional geometries, without departing from the scope of the disclosure. Rumor, the shaft 122 may also exhibit an outer profile of generally circular cross-section, but could alternatively exhibit other cross-sectional geometries that match the cross-sectional geometry of the sleeve channel 126. The sleeve 124 has an outer diameter in the range of about 50 mm to about 60 mm, typically having an outer diameter in the region of about 55 mm. The shaft 122 may have a length $L_1$ in the range of about 60 mm to about 65 mm, typically having a length $L_1$ in the region of about 63 mm. The sleeve channel 126 may exhibit a length $L_2$ in the range of about 60 mm to about 65 mm, typically having a length $L_2$ in the region of about 63 mm. In at least one embodiment, the shaft 122 and the sleeve channel 126 exhibit the same length, but could alternatively exhibit different lengths, without departing from the scope of the disclosure.

The matable geometry between the shaft 122 and the sleeve channel 126 allows the shaft 122 and the sleeve channel 126 to slidingly move relative to one another, thereby adjusting a distance D between the input and output couplings 102*a,b*, which may prove advantageous in allowing the adjustable shaft coupling 100 to be operatively coupled to drive and driven members arranged at varying distances from each other. In at least one embodiment, a lubricating substance may be applied at the interface between the shaft 122 and the sleeve channel 126 to facilitate smooth sliding translation between the two components. As will be appreciated, the length $L_1$ of the shaft 122 and the length $L_2$ sleeve channel 126 may determine the amount of co-axial displacement allowable between the input and output couplings 102*a,b*. In such embodiments, the engagement mechanism 202 may allow relative axial translation between the first and second adjustable spacer members 106*a,b* to adjust the distance D, while simultaneously preventing relative rotational movement, and thus transferring torque and rotational motion during operation. Accordingly, the distance D may be adjusted by axially translating one or both of the shaft 122 and the sleeve 124 along the central axis A and relative to the other.

Any one or more of the adjustable coupling hubs 104*a,b*, the adjustable spacer members 106*a,b*, and the engagement mechanism 202 may be manufactured from a material that provides a degree of flexibility therebetween during the transmission of torque and/or rotational motion. In such embodiments, the material may provide a degree of bending and torsional flexibility. Alternatively, or in addition thereto, the material may comprise a material that is a tough, yet resiliently deformable material, a material that is strong but not heavy. The material may include, but is not limited to, a metal (e.g., steel, aluminum, brass, etc.), a plastic, a composite material (e.g., carbon fiber, etc.), or any combination thereof.

As mentioned above, each adjustable coupling hub 104*a,b* may further include the gripping mechanism 112 operable to grip drive and driven members within the central cavity 110 defined in the corresponding body 108. The gripping mechanism 112 may be actuated and otherwise operated to displace the gripping members 114 radially inward and radially outward, thereby gripping against the drive and driven members at the central cavity 110. To facilitate the gripping action, each gripping mechanism 112 may include a gear assembly 208 housed within the body 108 and operable to radially displace the gripping members 114. The gear assembly 208 may include one or more gears potentially forming part of a gear train, for example, that may be actuated by operating (rotating) the corresponding rotatable socket 119 (FIGS. 1A-1B). Actuating the gear assembly 208 will correspondingly act on the associated gripping members 114, thereby displacing the gripping members 114 either radially outward or radially inward, depending on the actuation direction of the gear assembly 208.

In some embodiments, as illustrated, the gear assembly 208 may include a bevel gear 210 rotatably mounted within the housing 108 and operatively coupled to a corresponding one of the rotatable socket 119 (FIGS. 1A-1B) such that rotation of the rotatable socket 119 correspondingly rotates the bevel gear 210. Rotating the bevel gear 210 may directly or indirectly drive against a rack gear 212 defined on each gripping member 114. In some embodiments, one or more gears or geared engagements (not shown) may interpose the bevel gear 210 and the rack gears 212. Accordingly, rotating the bevel gear 210 correspondingly drives the rack gears 212 radially inward or radially outward, depending on the rotational direction of the bevel gear 210. Manually rotating or actuating the rotatable socket 119 correspondingly drives the rack gears 212 of the associated gripping mechanism 112 simultaneously between radially inward on radially outward directions, depending on the rotational direction of the rotatable socket 119.

Figure 3A:
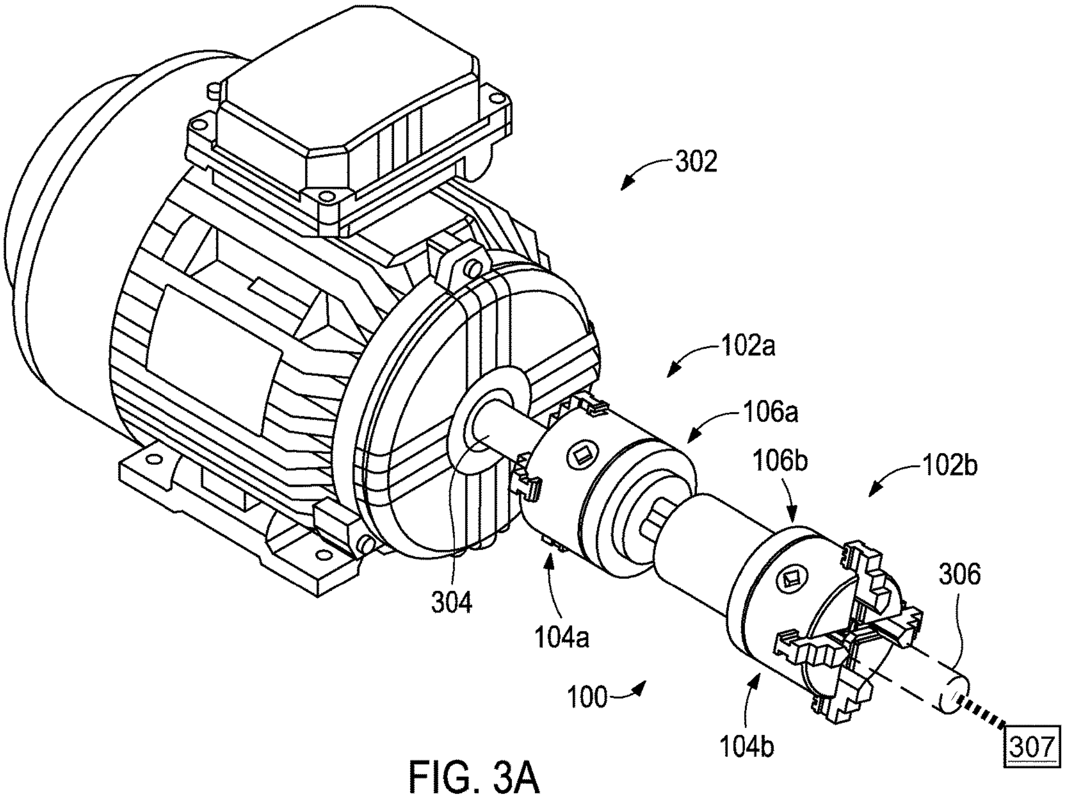
FIGS. 3A-3C are isometric, side, and a partial cross-sectional side views, respectively, of the adjustable shaft coupling operatively coupled to an example rotating machinery, according to one or more embodiments.
Figure 3B:
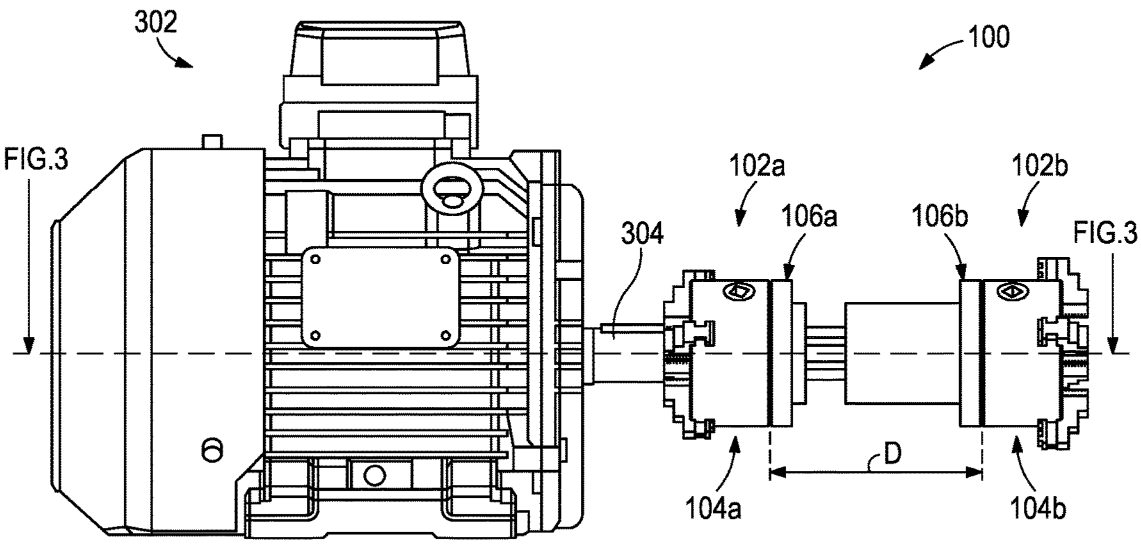
Figure 3C:
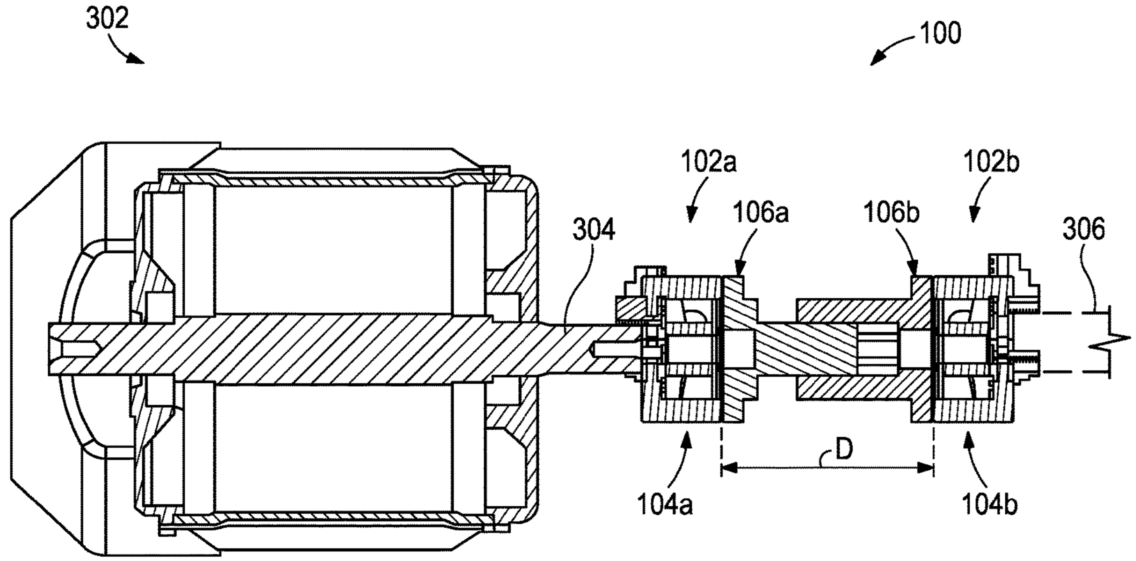

FIGS. 3A-3C are isometric, side, and a partial cross-sectional side views, respectively, of the adjustable shaft coupling 100 operatively coupled to an example rotating machinery 302, according to one or more embodiments. As illustrated, the rotating machinery 302 includes a drive member 304, and the adjustable shaft coupling 100 is operatively coupled to the drive member 304. The rotating machinery 302 may comprise any device or machine that generates rotational motion of the drive member 304, or alternatively requires the drive member 304 to rotate for operation. Examples of the rotating machinery 302 include, but are not limited to, a motor, a pump, a fan, a blower, a compressor, a generator, a turbine, a pulley, a wheel, one or more gears, any combination thereof, and the like.

As illustrated, the first adjustable coupling hub 104*a* of the input coupling 102*a* is in gripping engagement against an outer surface of one end of the drive member 304 such that rotating the drive member 304 by operating the rotating machinery 302 will correspondingly rotate the input coupling 102*a*, and thereby rotate the output coupling 102*b* in the same angular direction via the engagement between the adjustable spacer members. As illustrated, the second adjustable coupling hub 104*b* of the output coupling 102*b* is a gripping engagement against the outer surface of a driven member 306 (shown in dashed lines) such that rotating the output coupling 102*b* will correspondingly rotate the driven member 306, which will rotate another piece of rotating equipment (machinery) operatively coupled to the driven member, such as a second rotating machinery 307. Accordingly, in some embodiments, the adjustable shaft coupling 100 is used to transfer rotational motion of the rotating machinery 302 (e.g., the drive member 304) to a second rotating machinery 307.

In other embodiments, however, the adjustable shaft coupling 100 may be used to transfer rotational motion to the rotating machinery 302 from another machine (not shown). In such embodiments, when the first and second adjustable coupling hubs 104*a,b* are in gripping engagement with the drive and driven members 304, 306, respectively, the adjustable shaft coupling 100 may be rotated to cause the drive member 304 to rotate and thereby operate the rotating machinery 302. More specifically, the driven member 306 may be operatively coupled to a second rotating machinery 307 such that operating the second rotating machinery 307 causes the driven member 306 to rotate, which will cause the adjustable shaft coupling 100 to rotate. Rotating the adjustable shaft coupling 100 will correspondingly drive the drive member 304 and rotate (operate) the rotating machinery.

Moreover, as described above, the distance D between the input and output couplings 102*a,b* can be adjusted at the interface between the first and second adjustable spacer members 106*a,b*. This may prove advantageous in allowing the adjustable shaft coupling 100 to be operatively coupled to the rotating machinery 302 and a second rotating machinery 307 that may be arranged at varying distances from each other.

The adjustable shaft coupling 100 disclosed herein may offer numerous advantages. For example, the adjustable shaft coupling 100 may be capable of accommodating a wide range of misalignments between shafts (drive and driven members 304, 306), making them highly adaptable to various applications. Moreover, the adjustable shaft coupling 100 may minimize minimizing wear and tear of rotating machinery, thereby reducing the likelihood of breakdowns and unplanned downtime, ultimately saving businesses valuable time and money. The adjustable shaft coupling 100 may also improve the alignment of drive and driven shafts, which can lead to enhanced efficiency and overall performance of machinery. This, in turn, translates to better productivity and output. The adjustable shaft coupling 100 may further help to reduce noise and vibration. In particular, the flexible elements incorporated in the adjustable shaft coupling 100 may help dampen noise and vibration, thereby creating a quieter and more stable operating environment.

Embodiments of the adjustable shaft coupling 100 described herein may also help lower mated costs. In particular, the adjustable shaft coupling 100 may prolonging the lifespan of machinery compliments, thereby reducing maintenance expenses over time. Moreover, as described herein, the adjustable shaft coupling 100 may be easily installed, thereby saving time and labor costs during both the installation and maintenance processes. In certain applications the adjustable shaft coupling 100 may further safeguard machinery against overload conditions by allowing for torsional flexibility. This prevents damage to the equipment component while enhancing safety for operators and personnel.

Furthermore, as described herein, the adjustable shaft coupling 100 may be adjustable (sizes of the drive and driven members 304, 306). This increases the versatility and adaptability of the adjustable shaft coupling 100 to a variety of different applications. Accordingly, the adjustable shaft coupling 100 may be compatible with various shaft sizes, which increases the versatility and adaptability to different applications. The adjustable shaft coupling 100 may also optimize machinery alignment and efficiency, which can result in decreased energy consumption and operating costs. This may be especially beneficial in applications of high-energy costs or applications with a focus on sustainability. In addition, the adjustable shaft coupling 100 can be tailored to meet specific requirements of various applications reviewed by incorporating different materials, sizes and configurations, the adjustable shaft coupling 100 can be optimized for the machinery and specific needs thereof.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

The use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. An adjustable shaft coupling, comprising:

a first coupling including a first adjustable coupling hub operatively coupled to a first adjustable spacer member; and a second coupling including a second adjustable coupling hub operatively coupled to a second adjustable spacer member, wherein the first and second adjustable spacer members are engageable to co-axially align the first and second couplings along a central axis and transmit torque and rotational motion between the first and second couplings, wherein the first adjustable coupling hub is actuatable to grippingly engage a drive member, and the second adjustable coupling hub is actuatable to grippingly engage a driven member such that rotation of the drive member correspondingly rotates the driven member in a same angular direction, and wherein each adjustable coupling hub includes a body and a gripping mechanism mounted to the body, the gripping mechanism comprising a plurality of discrete gripping members, and each discrete gripping member being movable relative to the body along a path defined by the body to grippingly engage or release the drive or driven member.

2. The adjustable shaft coupling of claim 1, wherein the first and second adjustable coupling hubs are operatively coupled to the first and second adjustable spacer members, respectively, via a connecting arrangement comprising a nut-and-bolt arrangement.

3. The adjustable shaft coupling of claim 1, wherein:

the body of each adjustable coupling hub is a cylindrical body that defines a central cavity extending along the central axis and sized to receive an end of the drive or driven member; and the gripping mechanism of each adjustable coupling hub is actuatable to radially displace the plurality of gripping members towards or away from the central axis along the path defined by the body and thereby grippingly engage or release the drive or driven members.

4. The adjustable shaft coupling of claim 3, wherein each gripping member is mounted within a corresponding channel defined in the body and is displaceable within the channel.

5. The adjustable shaft coupling of claim 3, wherein the gripping mechanism further includes:

a gear assembly housed within the body and operatively coupled to the plurality of gripping members such that actuation of the gear assembly causes the plurality of gripping members to displace radially inwards or outwards; and a rotatable socket rotatably mounted to the body and operatively coupled to the gear assembly such that rotating the rotatable socket correspondingly actuates the gear assembly and radially displaces the plurality of gripping members.

6. The adjustable shaft coupling of claim 5, wherein the gear assembly includes a rack gear provided on each gripping member, and wherein rotating the rotatable socket actuates the gear assembly and drives the rack gear of each gripping member to thereby radially displace each gripping member.

7. The adjustable shaft coupling of claim 1, wherein the first adjustable spacer member includes a shaft and the second adjustable spacer member provides a sleeve that defines a sleeve channel sized to receive the shaft, and wherein receiving the shaft within the sleeve channel facilitates transfer of torque and rotational motion between the first and second couplings.

8. The adjustable shaft coupling of claim 7, further comprising an engagement mechanism that operatively couples the shaft to the sleeve such that rotation of the shaft correspondingly rotates the sleeve in the same angular direction, and vice versa.

9. The adjustable shaft coupling of claim 8, wherein the engagement mechanism comprises matable geometry including:

a plurality of longitudinally extending protrusions defined on the shaft; and a plurality of longitudinally extending slots defined in the sleeve channel and sized to mate with and receive the plurality of longitudinally extending protrusions.

10. The adjustable shaft coupling of claim 7, wherein a distance between the first and second couplings is adjustable by axially translating one or both of the shaft and the sleeve along the central axis and relative to the other.

11. A rotating machinery assembly comprising:

the adjustable shaft coupling of claim 1;

a first rotating machinery operatively coupled to the drive member; and a second rotating machinery operatively coupled to the driven member, wherein operation of the first rotating machinery rotates the drive member and causes the driven member to rotate in the same angular direction via interconnection through the adjustable shaft coupling.

12. The rotating machinery assembly of claim 11, wherein the first and second rotating machinery are selected from the group consisting of a motor, a pump, a fan, a blower, a compressor, a generator, a turbine, a pulley, a wheel, one or more gears, and any combination thereof.

13. A method of using an adjustable shaft coupling, comprising:

arranging the adjustable shaft coupling adjacent a first rotating machinery, the adjustable shaft coupling including:

a first coupling including a first adjustable coupling hub operatively coupled to a first adjustable spacer member; and a second coupling including a second adjustable coupling hub operatively coupled to a second adjustable spacer member, wherein each adjustable coupling hub includes a body and a gripping mechanism mounted to the body, the gripping mechanism comprising a plurality of discrete gripping members, and each discrete gripping member being movable relative to the body along a path defined by the body to grippingly engage or release the drive or driven member;

coupling the first adjustable coupling hub to a drive member of the first rotating machinery by moving the discrete gripping members of the first adjustable coupling hub along the path defined by the body of the first adjustable coupling hub;

coupling the second adjustable coupling hub to a driven member of a second rotating machinery by moving the discrete gripping members of the second adjustable coupling hub along the path defined by the body of the second adjustable coupling hub;

operatively coupling the first and second adjustable spacer members such that the first and second couplings are co-axially aligned along a central axis of the adjustable shaft coupling and rotate in unison;

operating the first rotating machinery and thereby rotating the drive member, which causes the adjustable shaft coupling to rotate in a same angular direction; and transferring torque and rotational motion of the drive member to the driven member via the adjustable shaft coupling.

14. The method of claim 13, wherein the body of each adjustable coupling hub is a cylindrical body that defines a central cavity extending along the central axis and sized to receive an end of the drive or driven member, and wherein coupling the first and second adjustable coupling hubs to the drive and driven members, respectively, comprises:

actuating the gripping mechanism and thereby displacing the plurality of gripping members radially inward along the path and toward the central axis; and grippingly engaging an outer surface of the drive or driven member with the plurality of gripping members.

15. The method of claim 14, wherein the gripping mechanism further includes a gear assembly housed within the body and operatively coupled to the plurality of gripping members, and a rotatable socket rotatably mounted to the body and operatively coupled to the gear assembly, and wherein actuating the gripping assembly comprises:

rotating the rotatable socket and thereby actuating the gear assembly;

radially displacing the plurality of gripping members as the gear assembly actuates.

16. The method of claim 13, wherein the first adjustable spacer member includes a shaft and the second adjustable spacer member provides a sleeve that defines a sleeve channel sized to receive the shaft, and wherein operatively coupling the first and second adjustable spacer members comprises:

receiving the shaft within the sleeve channel; and rotatably securing the sleeve to the shaft with an engagement mechanism such that rotation of the shaft correspondingly rotates the sleeve in the same angular direction.

17. The method of claim 16, further comprising axially translating one or both of the shaft and the sleeve along the central axis and relative to the other and thereby adjusting a distance between the first and second couplings.

* * * * *